(12) United States Patent
Yi et al.

(10) Patent No.: US 11,481,856 B2
(45) Date of Patent: Oct. 25, 2022

(54) IDENTIFYING HIGH RISK TRIPS USING CONTINUOUS CALL SEQUENCE ANALYSIS

(71) Applicant: Beijing DiDi Infinity Technology and Development Co., Ltd., Beijing (CN)

(72) Inventors: Zihan Yi, Mountain View, CA (US); Xin Chen, Sunnyvale, CA (US); Dong Li, Santa Clara, CA (US); Jing Chen, Palo Alto, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 662 days.

(21) Appl. No.: 16/438,288

(22) Filed: Jun. 11, 2019

(65) Prior Publication Data

US 2020/0394740 A1     Dec. 17, 2020

(51) Int. Cl.
   *G06Q 50/26*     (2012.01)
   *G06N 20/00*     (2019.01)
   *G06Q 10/02*     (2012.01)

(52) U.S. Cl.
   CPC ........... *G06Q 50/265* (2013.01); *G06N 20/00* (2019.01); *G06Q 10/02* (2013.01)

(58) Field of Classification Search
   CPC .................. G06Q 10/02; G06Q 50/30; G06Q 10/063114; G06Q 10/0635; G06Q 50/265
   USPC ........................................................... 705/5
   See application file for complete search history.

(56) References Cited

U.S. PATENT DOCUMENTS

| | | | |
|---|---|---|---|
| 10,762,441 B2* | 9/2020 | O'Herlihy | G06N 20/00 |
| 2018/0107935 A1* | 4/2018 | Jeon | G08G 1/012 |
| 2019/0019133 A1* | 1/2019 | Allen | G06Q 40/08 |
| 2019/0347582 A1* | 11/2019 | Allen | G06Q 10/02 |

FOREIGN PATENT DOCUMENTS

| | | |
|---|---|---|
| CN | 106056162 A | 10/2016 |
| CN | 109214614 A | 1/2019 |
| CN | 109242280 A | 1/2019 |

OTHER PUBLICATIONS

PCT International Search Report and the Written Opinion dated Sep. 23, 2020, issued in related International Application No. PCT/CN2020/095074 (9 pages).

\* cited by examiner

*Primary Examiner* — Victoria E. Frunzi
*Assistant Examiner* — Robert Fredeking
(74) *Attorney, Agent, or Firm* — Sheppard Mullin Richter & Hampton LLP (57) ABSTRACT

After receiving a trip request, a ridesharing platform system can determine scores for each prior trip request within a time window from features associated with the prior trip request. The ridesharing platform system can determine patterns from corresponding scores and determine a risk for the trip request using on the patterns. The ridesharing platform system can determine whether to accept or decline the trip request based on the risk for the trip request.

16 Claims, 7 Drawing Sheets

| Time Window 304t | Drivers' Information 304d | Passengers' Information 304p |
|---|---|---|
| Number of Calls<br>Number of Drivers<br>Time Periods (e.g., Morning, Afternoon, Night) | Age<br>Gender<br>Credit Stars<br>Car Models<br>Photos (Potential Crime Index) | Change Location<br>Good History<br>Enterprise<br>Credit Card |

IDENTIFYING HIGH RISK TRIPS USING CONTINUOUS CALL SEQUENCE ANALYSIS

TECHNICAL FIELD

The disclosure relates generally to identifying high risk trips.

BACKGROUND

Under traditional approaches, ridesharing platforms may be able to connect passengers and drivers on relatively short notice. However, traditional ridesharing platforms suffer from a variety of safety and security risks for both passengers and drivers.

SUMMARY

One aspect of the present disclosure is directed to a system for identifying a high risk trip. In some embodiments, the system comprises: one or more processors; and a memory storing instructions that, when executed by the one or more processors, cause the system to perform: receiving a current trip request by a passenger. The passenger can be associated with a plurality of prior trip requests within a prior time window. Each of the plurality of prior trip requests can be associated with a plurality of features comprising a plurality of time window-related features, a plurality of prior driver features, a plurality of passenger features, and a prior trip outcome. The prior trip outcome can indicate a positive trip outcome status or a negative outcome status. The instructions, when executed by the one or more processors, can cause the system to perform: generating a plurality of scores for each of the plurality of prior trip requests from the plurality of features associated with the prior trip request. The instructions, when executed by the one or more processors, can cause the system to perform: determining a plurality of patterns from the corresponding scores of the plurality of prior trip requests using a time series technique. The instructions, when executed by the one or more processors, can cause the system to perform: determining a risk for the current trip request from the plurality of patterns using a machine learning model. The machine learning model can be trained using a training dataset generated from an original dataset. The training dataset can comprise a plurality of training trip requests having a higher occurrence rate of training trip requests with positive trip outcome status than the original dataset. The instructions, when executed by the one or more processors, can cause the system to perform: determining the risk for the current trip request is below a trip risk threshold. The instructions, when executed by the one or more processors, can cause the system to perform: assigning a driver to the current trip request.

In some embodiments, the negative trip outcome status is an occurrence of an incident associated with a prior trip request, and/or the positive trip outcome status is an absence of an incident associated with a prior trip request.

Another aspect of the present disclosure is directed to a system for identifying a high risk trip. In some embodiments, the system comprises: one or more processors; and a memory storing instructions that, when executed by the one or more processors, cause the system to perform: receiving a current trip request by a passenger. The passenger can be associated with a plurality of prior trip requests within a prior time window. Each of the plurality of prior trip requests can be associated with a plurality of features comprising a time window profile, a prior driver profile, a passenger profile, and a prior trip outcome. The instructions, when executed by the one or more processors, can cause the system to perform: generating a plurality of scores for each of the plurality of prior trip requests from the plurality of features associated with the prior trip request. The instructions, when executed by the one or more processors, can cause the system to perform: determining a plurality of patterns from the corresponding scores of the plurality of prior trip requests. The instructions, when executed by the one or more processors, can cause the system to perform: determining a risk for the current trip request from the plurality of patterns. The instructions, when executed by the one or more processors, can cause the system to perform: assigning a current driver to the current trip request based on the risk of the current trip request relative to a trip risk threshold.

In some embodiments, the plurality of time-window-related features includes a number of drivers assigned to the plurality of prior trip requests, a number of the plurality of prior trip requests, trip destinations of the plurality of prior trip requests, trip request time of the plurality of prior trip requests, and a prior trip request of the plurality of prior trip requests having a trip completion time after a trip request time of a subsequent prior trip request of the prior trip requests. In some embodiments, the plurality of prior driver features of the prior trip request includes an age of a prior driver assigned to the prior trip request, a gender of the prior driver, a rating of the prior driver, a presence of a photo of the driver, and a car model associated with a profile of the driver. In some embodiments, the plurality of passenger features includes a behavior history of the passenger and stored payment information of the passenger.

In some embodiments, determining the plurality of patterns includes determining the plurality of patterns from the corresponding scores of the plurality of prior trip requests using a time series technique. In some embodiments, determining the risk of the current trip request includes determining the risk for the current trip request from the plurality of patterns using a machine learning model. The machine learning model can be trained using a training dataset generated from an original dataset. The training dataset can comprises a plurality of training trip requests having a higher occurrence rate of training trip requests with positive trip outcome status than the original dataset. The machine learning model can be trained by penalizing an incorrect determination of a negative trip outcome status less than an incorrect determination of a positive trip outcome status. In some embodiments, assigning the current driver to the current trip request comprises determining the risk of the current trip request is below the trip risk threshold.

Another aspect of the present disclosure is directed to a method for identifying a high risk trip. In some embodiments, the method comprises: under control of one or more processors: receiving a current trip request by a passenger, wherein the passenger is associated with a plurality of prior trip requests within a prior time window. Each of the plurality of prior trip requests can be associated with a plurality of features comprising a time window profile, a prior driver profile, a passenger profile, and a prior trip outcome. The method can comprise: generating a plurality of scores for each of the plurality of prior trip requests from the plurality of features associated with the prior trip request. The method can comprise: determining a plurality of patterns from the corresponding scores of the plurality of prior trip requests. The method can comprise: determining a risk for the current trip request from the plurality of patterns. The method can comprise: assigning a current driver to the current trip request based on the risk of the current trip request relative to a trip risk threshold.

In some embodiments, the plurality of time-window-related features includes a number of drivers assigned to the plurality of prior trip requests, a number of the plurality of prior trip requests, trip destinations of the plurality of prior trip requests, trip request time of the plurality of prior trip requests, and a prior trip request of the plurality of prior trip requests having a trip completion time after a trip request time of a subsequent prior trip request of the prior trip requests. The plurality of prior driver features of the prior trip request can include an age of a prior driver assigned to the prior trip request, a gender of the prior driver, a rating of the prior driver, a presence of a photo of the driver, and a car model associated with a profile of the driver. The plurality of passenger features can include a behavior history of the passenger and stored payment information of the passenger.

In some embodiments, determining the plurality of patterns includes determining the plurality of patterns from the corresponding scores of the plurality of prior trip requests using a time series technique. In some embodiments, determining the risk of the current trip request includes determining the risk for the current trip request from the plurality of patterns using a machine learning model. The method can further comprise: training the machine learning model. Training the machine learning model can comprise: using a training dataset. The training dataset can be generated from an original dataset. The training dataset can comprise a plurality of training trip requests having a higher occurrence rate of training trip requests with positive trip outcome status than the original dataset. Training the machine learning model can comprise penalizing an incorrect determination of a negative trip outcome status less than an incorrect determination of a positive trip outcome status.

In some embodiments, assigning the current driver to the current trip request comprises determining the risk of the current trip request is below the trip risk threshold.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

The approaches disclosed herein may improve the safety and security of a ride sharing service. More specifically, for example, the approaches disclosed herein enable and/or improve driver safety in a ridesharing service. A strong correlation exists between incidents with passengers being the offenders and the drivers being the victims and the behavior patterns of passengers' trip requests on a ridesharing platform. As used herein, an incident may be a physical incident (e.g., an assault). High risk trips for drivers can be identified using continuous call or request sequence analysis. For example, after receiving a trip request, a ridesharing platform system can determine scores for each prior trip request within a time window from features associated with the prior trip request (e.g., time-window-related features, prior-driver features, and passenger features). The ridesharing platform system can determine patterns from corresponding scores and determine a risk for the trip request using the patterns. The ridesharing platform system can determine whether to accept or decline the trip request based on the risk for the trip request.

Passenger, Driver, and Ridesharing Platform System Interactions

Figure 1:
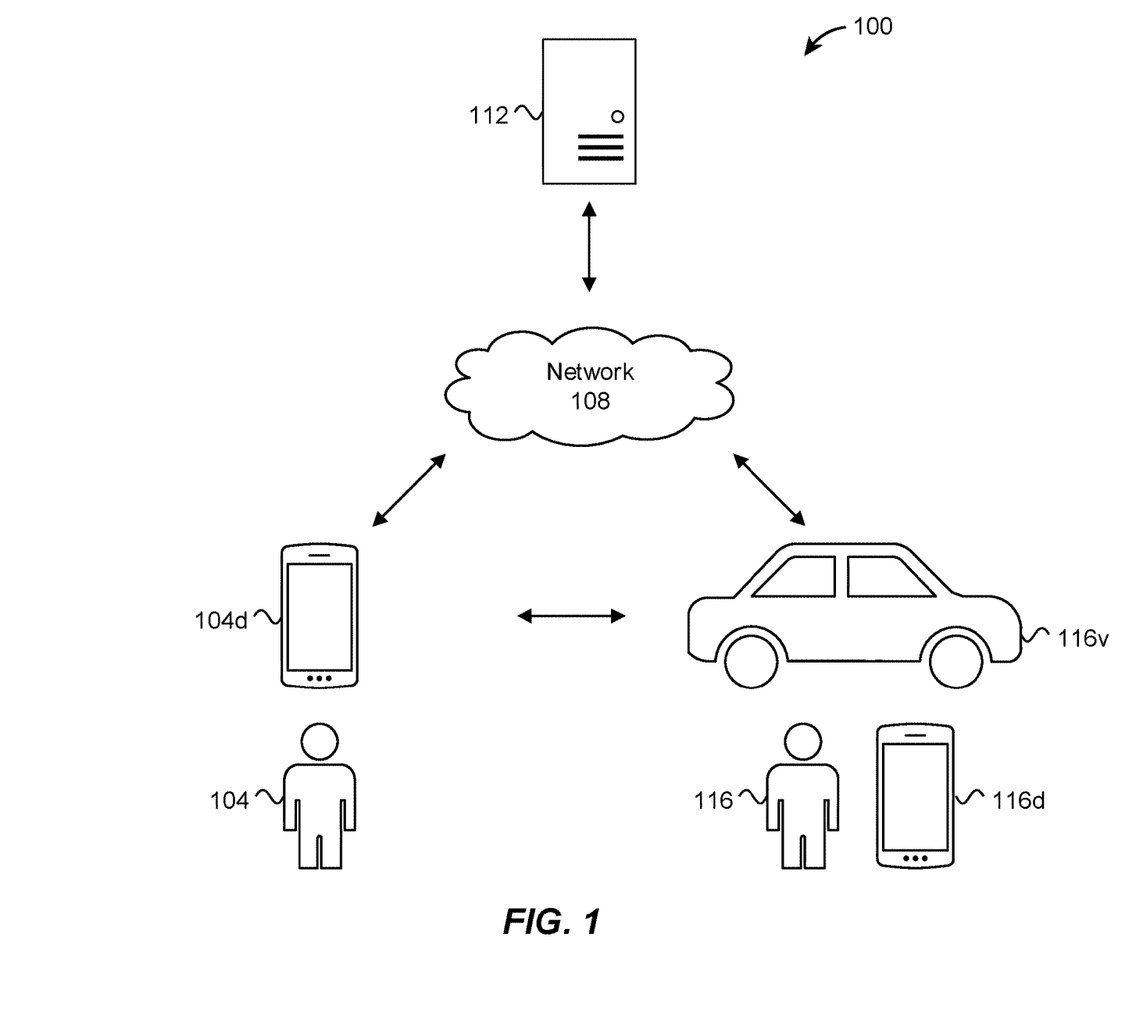
FIG. 1 illustrates an example environment for a ridesharing platform system, in accordance with various embodiments of the disclosure.

FIG. 1 illustrates an example environment for a ridesharing platform system. In the environment 100 of FIG. 1, a passenger 104 uses a passenger device 104d (e.g., a smartphone, a tablet, or a computer) to make a trip request, via a communication network 108 (e.g., the Internet) to a ridesharing platform system 112 (such as the computing system 200 described with reference to FIG. 2). The ridesharing platform system 112 can in turn assign a driver 116 and the driver's vehicle 116 (e.g., a car, a SUV, and a truck) to fulfill the trip request. The driver 116 can receive and accept or decline the trip request using a driver device 116d (e.g., a smartphone, a tablet, or a computer). The driver device 116d can be a standalone device or part of the driver's vehicle 116.

During an onboarding process, the passenger 104 and the driver 116 can provide personal information to the ridesharing platform system 112. Stringent background checks can increase driver safety and passenger safety. The passenger 104 can provide the ridesharing platform system 112 with a pickup location and a drop off or destination location of a trip and receive pricing information (e.g., the estimated cost of the trip) and timing information (e.g. the estimated duration of the trip). If the pricing information and timing information are acceptable to the passenger 104, the passenger 104 can make a trip request or place an order (e.g., by clicking an order button) to the ridesharing platform system 112. After receiving the trip request from the passenger 104, the ridesharing platform system 112 can decide whether to accept the trip request and assign or match the driver 116 to the passenger for the particular trip request. Declining or rejecting a trip request of a passenger determined to be likely an offender in an incident can increase driver safety. The driver 116 can proceed to and arrive at the pickup location, where the passenger 104 can enter the driver's vehicle 116v. The passenger 104 can pay (e.g., with cash or via the ridesharing platform system 112) the driver 116 after arrival at the drop off location.

Using the passenger device 104d, the passenger 104 can interact with the ridesharing platform system 112 and request ridesharing services. For example, the passenger 140, using the passenger device 104d, can make a trip request to the ridesharing platform system 112. A trip request can include rider identification information, the number of passengers for the trip, a requested type of the provider (e.g., a vehicle type or service option identifier), the pickup location (e.g., a user-specified location, or a current location of the passenger device 104d as determined using, for example, a global positioning system (GPS) receiver), and/ or the destination for the trip.

The passenger device 104d can interact with the ridesharing platform system 112 through a client application configured to interact with the ridesharing platform system 112. The client application can present information, using a user interface, received from the ridesharing platform system 112 and transmit information to the ridesharing platform system 112. The information presented on the user interface can include driver-related information, such as driver identity, driver vehicle information, driver vehicle location, and driver estimated arrival. The information presented on the user interface can include the drop off location, a route from the pickup location to the drop off location, an estimated trip duration, an estimated trip cost, and current traffic condition. The passenger device 104d can include a location sensor, such as a global positioning system (GPS) receiver, that can determine the current location of the passenger device 104d. The user interface presented by the client application can include the current location of the passenger device 104. The information transmitted can include a trip request, a pickup location, and a drop off location.

The ridesharing platform system 112 can allow the passenger 104 to specify parameters for the trip specified in the trip request, such as a vehicle type, a pick-up location, a trip destination, a target trip price, and/or a departure timeframe for the trip. The ridesharing platform system 112 can determine whether to accept or reject the trip request and, if so, assign or attempt to assign the driver 116 with the driver vehicle 116v and the driver device 116d to the passenger 104 and the passenger's trip request. For example, the ridesharing platform system 112 can receive a trip request from the passenger device 104d, select a driver from a pool of available drivers to provide the trip, and transmit an assignment request to the selected driver's device 116d.

The driver 116 can interact with, via the driver device 116d, the ridesharing platform system 112 to receive an assignment request to fulfill the trip request. The driver can decide to start receiving assignment requests by going online (e.g., launching a driver application and/or providing input on the driver application to indicate that the driver is receiving assignments), and stop receiving assignment requests by going offline. The driver 116 can receive, from the ridesharing platform system 112, an assignment request to fulfill a trip request made by the passenger using the passenger device 104d to the ridesharing platform system 112. The driver 116 can, using the driver device 116d, accepting or reject the assignment request. By accepting the assignment request, the driver 116 and the driver's vehicle 116v is assigned to the particular trip of the passenger 104, and is provided the passenger's pickup location and trip destination.

The driver device 116d can interact with the ridesharing platform system 112 through a client application configured to interact with the ridesharing platform system 112. The client application can present information, using a user interface, received from the ridesharing platform system 112 (e.g., an assignment request, a pickup location, a drop off location, a route from the pickup location to the drop off location, an estimated trip duration, current traffic condition, and passenger-related information, such as passenger name and gender) and transmit information to the ridesharing platform system 112 (e.g., an acceptance of an assignment request). The driver device 116d can include a location sensor, such as a global positioning system (GPS) receiver, that can determine the current location of the driver device 116d. The user interface presented by the client application can include the current location of the driver device 116 and a route from the current location of the driver device 116 to the pickup location. After accepting the assignment, the driver 116, using the driver's vehicle 116v, can proceed to the pickup location of the trip request to pick up the passenger 104.

The passenger device 104d and the driver device 116d can communicate with the ridesharing platform system 112 via the network 108 The network 108 can include one or more local area and wide area networks employing wired and/or wireless communication technologies (e.g., 3G, 4G, and 5G), one or more communication protocols (e.g., transmission control protocol/Internet protocol (TCP/IP) and hypertext transport protocol (HTTP)), and one or more formats (e.g., hypertext markup language (HTML) and extensible markup language (XML).

Continuous Call Sequence Analysis

Figure 2:
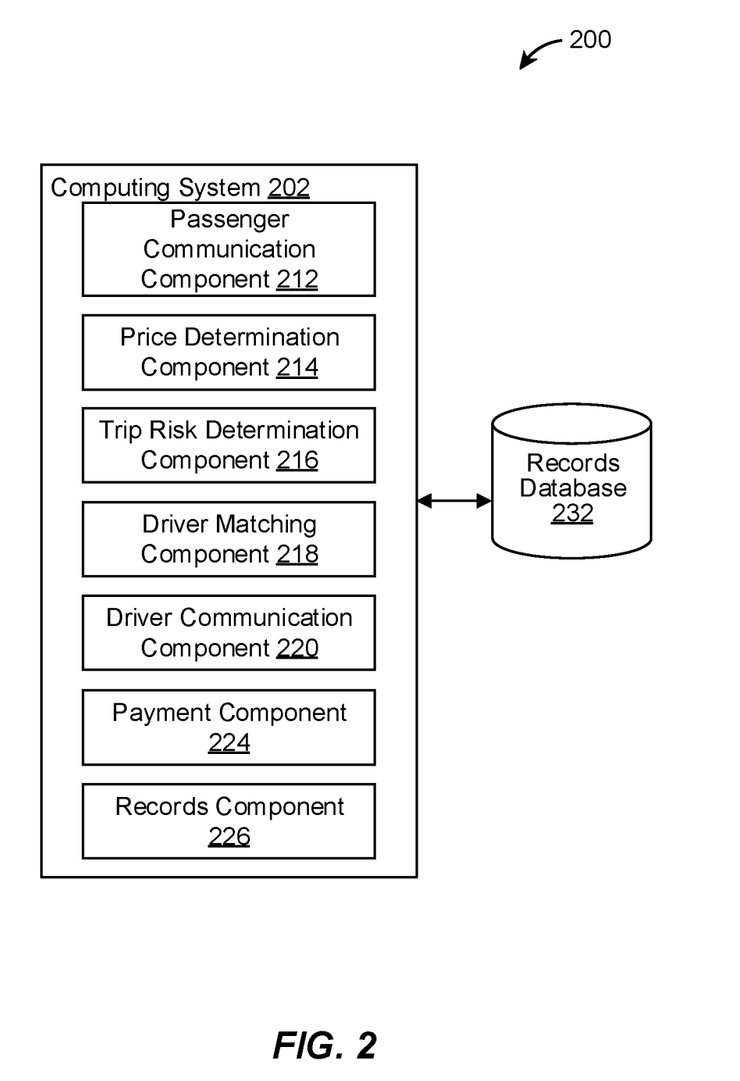
FIG. 2 illustrates an example environment for a ridesharing platform system, in accordance with various embodiments of the disclosure.

FIG. 2 illustrates an example environment 200 for a ridesharing platform system, in accordance with various embodiments. The example environment 200 may include a ridesharing computing system 202. The computing system 202 may include one or more processors and memory (e.g., permanent memory, temporary memory). The processor(s) may be configured to perform various operations by interpreting machine-readable instructions stored in the memory. The computing system 202 may include other computing resources. The computing system 202 may have access (e.g., via one or more connections, via one or more networks) to other computing resources.

The computing system 202 may include a passenger communication component 212, a price determination component 214, a trip risk determination component 216, a driver matching component 218, a driver communication component 220, a payment component 222, and a trip records component 224. The computing system 202 may include other components. While the computing system 202 is shown in FIG. 2 as a single entity, this is merely for ease of reference and is not meant to be limiting. One or more components or one or more functionalities of the computing system 202 described herein may be implemented in software. One or more components or one or more functionalities of the computing system 202 described herein may be implemented in hardware. One or more components or one or more functionalities of the computing system 202 described herein may be implemented in a single computing device or multiple computing devices. In some embodiments, one or more components or one or more functionalities of the computing system 202 described herein may be implemented in one or more networks (e.g., enterprise networks), one or more endpoints, one or more servers, or one or more clouds.

A passenger (or a passenger's device, such as the passenger device 104 described with reference to FIG. 1) can communicate with the ridesharing computing system 202 via the passenger communication component 212. For example, during the onboarding process, the passenger can provide personal information to the ridesharing computing system 202 via the passenger communication component 212. For example, the passenger can provide the ridesharing computing system 202, via the passenger communication component 212, with a pickup location and a drop off location of a trip. For example, the passenger communication component 212 can provide the passenger with pricing information of the trip (e.g., the estimated cost of the trip) and timing information of the trip (e.g. the estimated duration of the trip). If the pricing information and timing information are acceptable to the passenger, the passenger can make a trip request or place an order (e.g., by clicking an order button) to the ridesharing computing system 202, via the passenger communication component 212. After receiving the trip request from the passenger, the ridesharing computing system 202 can determine whether to accept or decline the trip request based on a risk of the trip determined using the risk determination component 216. If the risk is acceptable (e.g., below a threshold level), the ridesharing computing system 202 can assign or match the driver to the passenger for the particular trip request using the driver matching component 218. The ridesharing computing system 202, using the driver communication component 220, can provide the assigned driver with an assignment of the trip request. The ridesharing computing system 202, using the driver communication component 220, can receive the driver's acceptance of the assignment of the trip request. The driver communication component 220 can provide the driver with information relating to the progress of the trip, such as the driver's distances from the pickup location and drop off location and a route from the pickup location to the drop off location. The ridesharing computing system 202, using the payment component 224, can receive the passenger's payment for the trip. The records component 226 can store information related to the trip (e.g., the driver information) in the records database 232. The records database 232 can also store the passenger information and the driver information (e.g., received during the onboarding process).

In determining the risk of a trip, the trip risk determination component 216 may acquire, analyze, determine, examine, identify, load, locate, obtain, open, receive, retrieve, and/or review passenger information. The trip risk determination component 216 may access the passenger information from one or more locations. For example, the risk determination component 216 may access passenger information from a storage location, such as an electronic storage 232 of the computing system 202, an electronic storage of a device accessible via a network, another computing device/system (e.g., desktop, laptop, smartphone, tablet, mobile device), or other locations.

A passenger who plans an incident with respect to a driver may show certain behavior patterns during the trip requesting process. For example, a passenger may cancel several trip requests until the passenger finds the target driver and vehicle. For example, a criminal may tend to choose a particular driver gender, particular vehicle type, and/or the like. After a passenger makes a request for a trip, whether the trip is risky can be identified, by the trip risk determination component 216, based on factors such as passenger information (e.g., a passenger profile), driver information (e.g., a driver profile), and time window-related information (e.g., passenger behavior patterns before the passenger is picked up by the driver). Features for analyzing the behavior of a passenger within a time window can include passenger information, driver information, and time window-related information. Time window-related information can be retrieved from the records database 232 or determined using information received in the records database 232.

Figure 3:
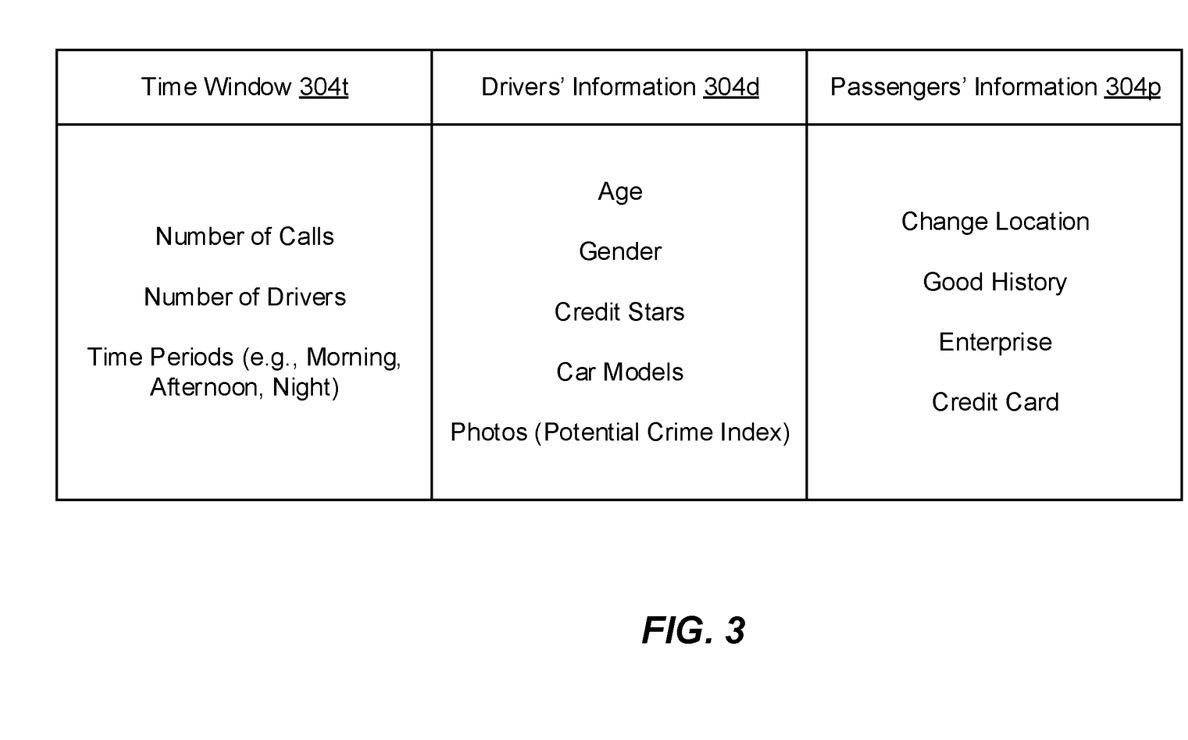
FIG. 3 illustrates example features for trip risk determination, in accordance with various embodiments of the disclosure.

FIG. 3 illustrates example features for trip risk determination, in accordance with various embodiments of the disclosure. Passenger information 304p can include whether the passenger has changed the pickup location and/or drop off location, the number of times the passenger has changed the pickup location and/or drop off location, the passenger's history with the ridesharing platform (e.g., the number of rides the passenger has requested and completed, or how long the passenger has been a user of the ridesharing platform, or how long the passenger has been an active user of the ridesharing platform), whether the passenger is using enterprise pay (e.g., whether the passenger has an account affiliated with a company that is paying for the trip or a prior trip), and/or whether the passenger has a credit card on file with the ridesharing platform. A passenger profile can include the historical behavior of the user, such as the number of days since the passenger's registration, a historical cancel ratio (e.g., since the passenger's registration or within a time period, such as the last week, the last month, the last year), and number of orders completed (e.g., since the passenger's registration or within a time period, such as the last week, the last month, the last year). A passenger profile can include whether the passenger is using a credit card to pay for the trip and whether the passenger is using enterprise pay.

Driver information 304d can include the driver's age, the driver's gender, the driver's rating (e.g., the driver's rating by the passengers), the model of the driver's vehicle, and whether the driver has a photo on file with the ridesharing platform (e.g., whether the passenger could see the photo of the driver). The photo can be a measure of or used to determine a potential crime index. Driver profile can include all information about the driver that a passenger can obtain when making a trip request or placing an order, such as the driver's age, the driver's gender, the driver's rating (e.g., the driver's star rating), driver's photo(s), and the driver's car model.

Time window-related information 304t can include the number of trip requests the passenger has made within a time window, the number of drivers that have been assigned to the passenger's trip requests (which may have been canceled after the assignments) within the time window, and when the passenger should be picked up (e.g., the time the trip requests were made, or the pickup time specified by the trip requests, such as morning, afternoon, night). For example, two trip requests close in time (whether the first trip request had been completed when the second trip request was made) can be indicative of a passenger trying to pick a vulnerable driver.

Figure 4:
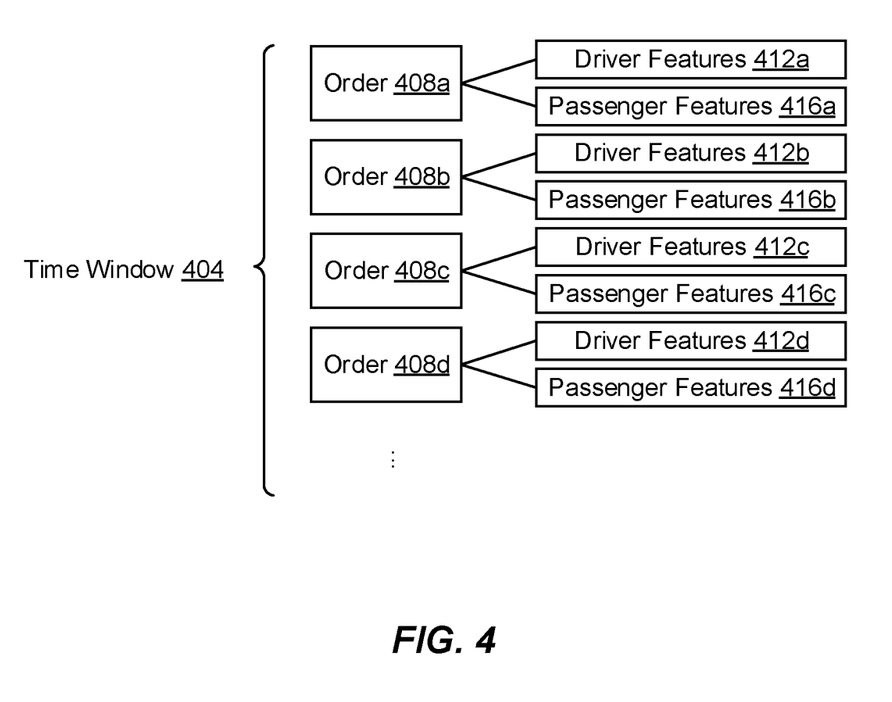
FIG. 4 illustrates an example time window used for trip risk determination, in accordance with various embodiments of the disclosure.

FIG. 4 illustrates an example time window used for determining the risk of a trip. For example, the trip risk determination component 216 can observe the pattern of the passenger in a time window 404 (e.g., the past few hours) to decide whether the passenger is picking a driver. The patterns can include drivers' profiles or features 412a-412d that the passenger has seen within the time window 404, the number of calls (or orders or requests) 408a-408d that the passenger placed in the time window and some derived patterns (e.g., whether the passenger is changing destination locations, and whether the passenger is calling another order before finishing the previous order), and the current location and current time. The passenger profiles 416a-416d of the calls (or orders or requests) 408a-408d can be the same or different. For example, the passenger can update the passenger's profile during the time window 404.

Figure 5:
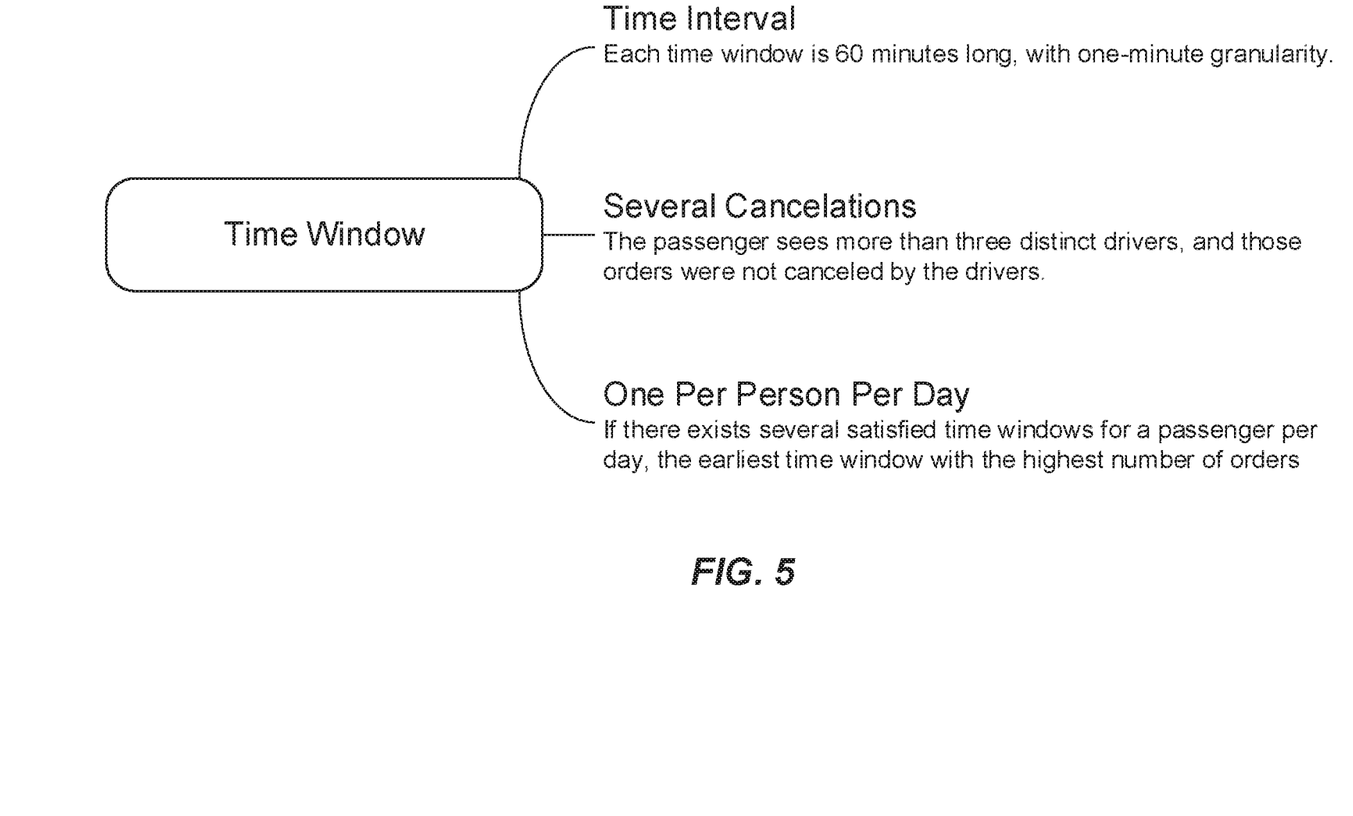
FIG. 5 illustrate an example time window definition used for trip risk determination, in accordance with various embodiments of the disclosure.

FIG. 5 illustrate an example time window definition used for trip risk determination. In the time window definition illustrated in FIG. 5, each time window is 60 minutes long. Each time interval can have one-minute granularity. Successive time windows can overlap (e.g., by 1 minute, 10 minutes, 30 minutes, or 59 minutes). Successive time windows can be non-overlapping. In a time window, the passenger had several cancellations (e.g., 1, 2, 3, 5, 10, or more cancellations) not by drivers. If multiple time windows in a day satisfy the time window definition, the time-window related features of one time window (e.g., the earliest time window, the time window with the highest number of rides, or a combination thereof) can be used for determining the risk of a trip.

Referring to FIG. 2, the trip risk determination component 216 can generate a plurality of scores for each prior trip request within a time window from a plurality of features associated with the prior trip request. The trip risk determination component 216 can determine a plurality of patterns from the corresponding scores of the plurality of prior trip requests using a time series technique. The trip risk determination component 216 can determine a risk for the current trip request from the plurality of patterns using a machine learning model. The number of orders in the time window can vary from order to order (or request to request), and the patterns of the time window involve a time series problem. The trip risk determination component 216 can convert the behaviors in the window to some features which are readable to the model without losing much useful information. The features for each order can be collected and converted into several principal scores (e.g., by principal component analysis), and extract patterns of these sequences of different scores from the orders in the time window and from the current order or trip request. After that, the trip risk determination component 216 can use time series techniques and machine learning techniques to compare the patterns, and produce a prediction result.

The machine learning model can be trained using a training dataset generated from an original dataset. The training dataset can comprise a plurality of training trip requests having a higher occurrence rate of training trip requests with positive trip outcome status than the original dataset. The original dataset can include millions of normal or negative orders (e.g., orders without incidents) and only a few problematic or positive orders every day (e.g., orders with incidents), the ratio of positive cases and negative cases is extremely imbalanced. The machine learning model has to be trained to predict the few problematic orders from millions of normal orders without predicting too many normal orders as problematic orders. The training dataset can be generated from the original dataset of millions of orders using sampling methods such as query by bagging (e.g., undersampling on negative cases), selective sampling (e.g., taking samples with similar distributions), and oversampling on positive cases. In some embodiments, the machine learning model includes a cascading classifier to help pick out the positive cases step by step.

Continuous Call Sequence Method

Figure 6:
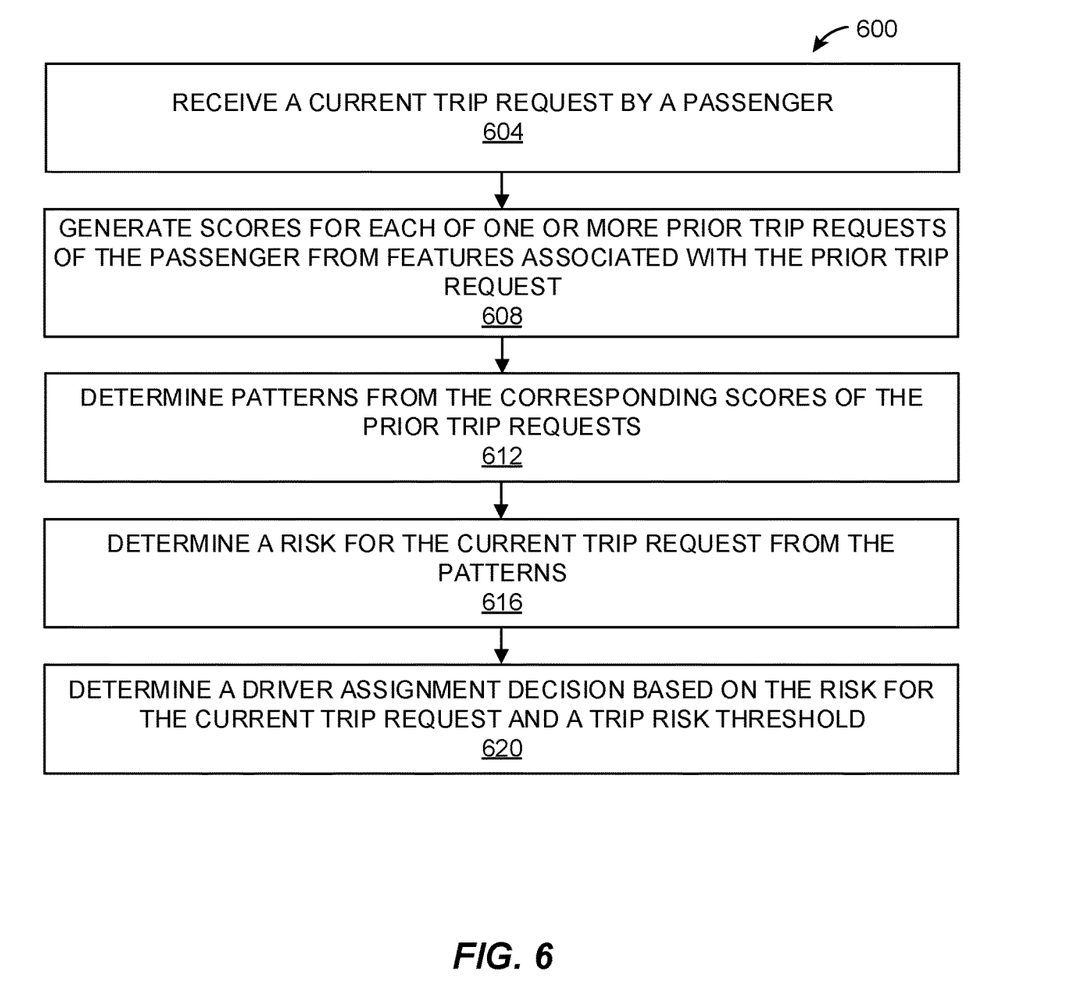
FIG. 6 is a flowchart of an example method for determining whether to accept or decline a trip request, in accordance with various embodiments of the disclosure.

FIG. 6 illustrates a flowchart of an example method 600, according to various embodiments of the present disclosure. The method 600 may be implemented in various environments including, for example, the environment 200 of FIG. 2 and by computer systems, such as the computer system 700 of FIG. 7. The operations of the method 600 presented below are intended to be illustrative. Depending on the implementation, the method 600 may include additional, fewer, or alternative steps performed in various orders or in parallel. The method 600 may be implemented in various computing systems or devices including one or more processors.

Figure 7:
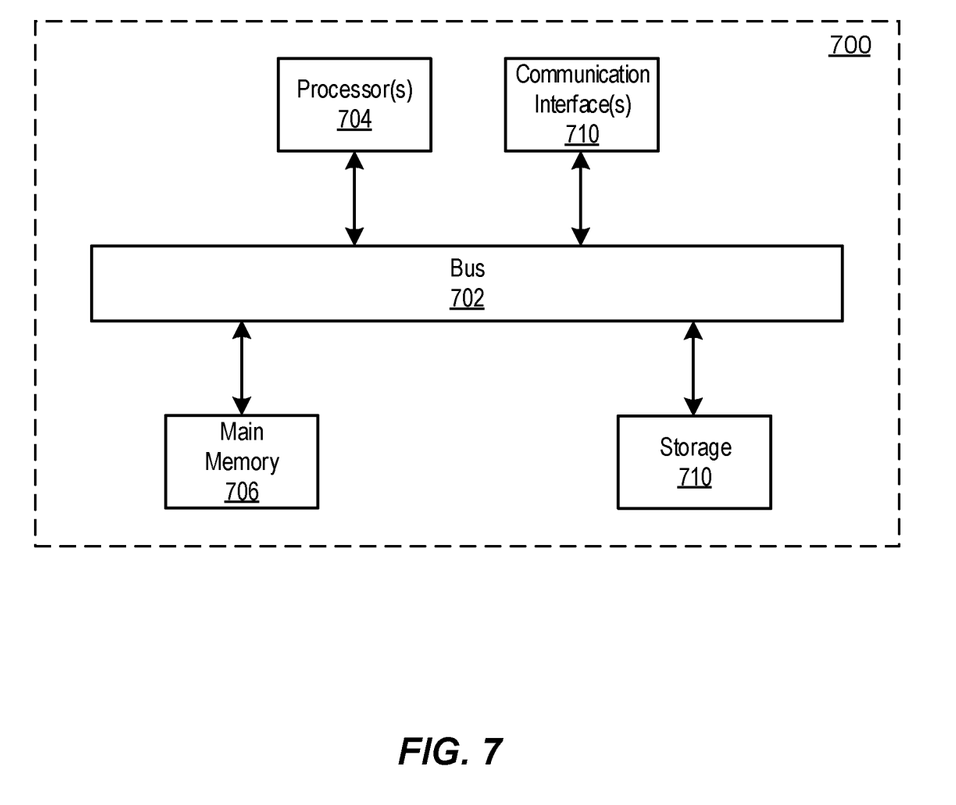
FIG. 7 is a block diagram of an example computer system in which any of the embodiments described herein may be implemented.

With respect to the method 600, at block 604, a computer system, such as the computer system 700 of FIG. 7, can receive a current trip request by a passenger. The passenger can be associated with a plurality of prior trip requests within a prior time window. In some embodiments, each of the plurality of prior trip requests is associated with a plurality of features comprising a time window profile, a prior driver profile, a passenger profile, and a prior trip outcome. The time window profile can comprise a plurality of time window-related features. The prior driver profile can comprise a plurality of prior driver features. The passenger profile can comprise a plurality of passenger features. In some embodiments, each of the plurality of prior trip requests is associated with a plurality of features comprising a plurality of time window-related features, a plurality of prior driver features, a plurality of passenger features, and a prior trip outcome.

In some embodiments, the plurality of time-window-related features includes a number of drivers assigned to the plurality of prior trip requests, a number of the plurality of prior trip requests, trip destinations of the plurality of prior trip requests, trip request time of the plurality of prior trip requests, and a prior trip request of the plurality of prior trip requests having a trip completion time after a trip request time of a subsequent prior trip request of the prior trip requests. In some embodiments, the plurality of prior driver features of the prior trip request includes an age of a prior driver assigned to the prior trip request, a gender of the prior driver, a rating of the prior driver, a presence of a photo of the driver, and a car model associated with a profile of the driver. In some embodiments, the plurality of passenger features includes a behavior history of the passenger and stored payment information of the passenger.

The prior trip outcome can be a positive trip outcome status or a negative outcome status. In some embodiments, the prior trip outcome can be a canceled trip outcome status. The negative trip outcome status can be an occurrence of an incident associated with a prior trip request. The positive trip outcome status can be an absence of an incident associated with a prior trip request.

With respect to the method 600, at block 608, the computer system can generate a plurality of scores for each of the plurality of prior trip requests from the plurality of features associated with the prior trip request. For example, the computer system can generate a plurality of principal scores (e.g., by principal component analysis) for each of the plurality of prior trip requests from the plurality of features associated with the prior trip request. With respect to the method 600, at block 612, the computer system can determine a plurality of patterns from the corresponding scores of the plurality of prior trip requests. The computer system can determine the plurality of patterns from the corresponding scores of the plurality of prior trip requests using a time series technique.

The number of orders in the time window can vary from order to order (or request to request). The computing system can convert the passenger's behaviors in the window to some patterns which are readable by a machine learning model without losing much useful information. The features for each order can be collected and converted into several principal scores (e.g., by principal component analysis), and extract patterns of these sequences of different scores from the orders in the time window and from the current order or trip request.

With respect to the method 600, at block 616, the computer system can determine a risk for the current trip request from the plurality of patterns. To determine the risk of the current trip request, the computer system can determine a risk for the current trip request from the plurality of patterns using a machine learning model. For example, the machine learning model can be trained using a training dataset generated from an original dataset. The training dataset can comprise a plurality of training trip requests having a higher occurrence rate of training trip requests with positive trip outcome status than the original dataset. As another example, the machine learning model can be trained by penalizing an incorrect determination of a negative trip outcome status less than an incorrect determination of a positive trip outcome status.

The original dataset can include millions of normal or negative orders (e.g., orders without incidents) and only a few problematic or positive orders every day (e.g., orders with incidents), the ratio of positive cases and negative cases is extremely imbalanced. The machine learning model has to be trained to predict the few problematic orders from millions of normal orders without predicting too many normal orders as problematic orders. The training dataset can be generated from the original dataset of millions of orders using sampling methods such as query by bagging (e.g., undersampling on negative cases), selective sampling (e.g., taking samples with similar distributions), and oversampling on positive cases. In some embodiments, the machine learning model includes a cascading classifier to help pick out the positive cases step by step.

The parameters of the machine learning model (e.g., a neural network (NN) can be set in a process referred to as training. For example, the machine learning model can be trained using training data that includes input data and the correct or preferred output of the model for the corresponding input data. Sets of individual input vectors ("mini-batches") can be processed at the same time by using an input matrix instead of a single input vector, which may speed up training. The machine learning model can repeatedly process the input data, and the parameters (e.g., the weight matrices) of the machine learning model can be modified in what amounts to a trial-and-error process until the model produces (or "converges" on) the correct or preferred output. The modification of weight values may be performed through a process referred to as "back propagation." Back propagation includes determining the difference between the expected model output and the obtained model output, and then determining how to modify the values of some or all parameters of the model to reduce the difference between the expected model output and the obtained model output.

With respect to the method 600, at block 620, the computer system can determine a trip request decision based on the risk of the current risk request and a trip risk threshold. The computer system can determine the risk of the current trip request is above or below the trip risk threshold. For example, the computer system can determine to decline the trip request based on the risk of the current trip request relative to a trip risk threshold. The computer system can decline the trip request if the risk of the current trip request is above the trip risk threshold. As another example, the computer system can assign a current driver to the current trip request based on the risk of the current trip request relative to a trip risk threshold. The computer system can determine the risk for the current trip request is below a trip risk threshold and assign a driver to the current trip request.

Computer System

FIG. 7 is a block diagram that illustrates a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor(s) 704. Main memory 706 also may be used for storing temporary variables or other intermediate information during execution of instructions to be executed by processor(s) 704. Such instructions, when stored in storage media accessible to processor(s) 704, render computer system 700 into a special-purpose machine that is customized to perform the operations specified in the instructions. Main memory 706 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 708. Execution of the sequences of instructions contained in main memory 706 causes processor(s) 704 to perform the process steps described herein. For example, the process/method shown in FIG. 6 and described in connection with this figure may be implemented by computer program instructions stored in main memory 706. When these instructions are executed by processor(s) 704, they may perform the steps as shown in FIG. 6 and described above. In alternative embodiments, hard-wired circuitry may be used in place of or in combination with software instructions.

The computer system 700 also includes a communication interface 710 coupled to bus 702. Communication interface 710 provides a two-way data communication coupling to one or more network links that are connected to one or more networks. As another example, communication interface 710 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Certain embodiments are described herein as including logic or a number of components. Components may constitute either software components (e.g., code embodied on a machine-readable medium) or hardware components (e.g., a tangible unit capable of performing certain operations which may be configured or arranged in a certain physical manner). As used herein, for convenience, components of the computing system 102 may be described as performing or configured for performing an operation, when the components may comprise instructions which may program or configure the computing system 102 to perform the operation.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A system for identifying a high risk trip, the system comprising:
   one or more processors; and
   a memory storing instructions that, when executed by the one or more processors, cause the system to perform:
   training a machine learning model based on a plurality of training trips sampled from a plurality of historical trips to determine a risk for a given trip request, wherein the training comprises:
   generating a plurality of historical scores for each of the plurality of training trips based on features of the each training trip;
   determining a plurality of historical patterns based on the plurality of historical scores for each of the plurality of training trips;
   inputting the plurality of historical patterns into the machine learning model to obtain predictions;
   adjusting parameters of the machine learning model to converge the predictions and corresponding trip labels of the plurality of training trips, wherein the parameters are adjusted to penalize incorrect predictions and thus minimize future incorrect predictions, and the parameters are adjusted with a less degree for a false-positive prediction than for a false-negative prediction;
   receiving a current trip request by a passenger, wherein the passenger is associated with a plurality of prior trip requests within a prior time window, wherein each of the plurality of prior trip requests is associated with a plurality of features comprising a plurality of time window-related features, a plurality of prior driver features, a plurality of passenger features, and a prior trip outcome, and wherein the prior trip outcome indicates a positive trip outcome status or a negative outcome status;
   generating a plurality of scores for each of the plurality of prior trip requests from the plurality of features associated with the prior trip request;
   determining a plurality of patterns from the corresponding scores of the plurality of prior trip requests using a time series technique;
   determining a risk for the current trip request from the plurality of patterns by inputting the plurality of patterns into the machine learning model and obtaining a predicted risk of the current trip from the machine learning model; and
   determining the risk for the current trip request is below a trip risk threshold and assigning a driver to the current trip request.

2. The system of claim 1, wherein the negative trip is an occurrence of an incident associated with a prior trip request, and wherein the positive trip is an absence of an incident associated with a prior trip request.

3. A system for identifying a high risk trip, the system comprising:
   one or more processors; and
   a memory storing instructions that, when executed by the one or more processors, cause the system to perform:
   training a machine learning model based on a plurality of training trips sampled from a plurality of historical trips to determine a risk for a given trip request, wherein the training comprises:
   generating a plurality of historical scores for each of the plurality of training trips based on features of the each training trip;
   determining a plurality of historical patterns based on the plurality of historical scores for each of the plurality of training trips;
   inputting the plurality of historical patterns into the machine learning model to obtain predictions;
   adjusting parameters of the machine learning model to converge the predictions and corresponding trip labels of the plurality of training trips, wherein the parameters are adjusted to penalize incorrect predictions and thus minimize future incorrect predictions, and the parameters are adjusted with a less degree for a false-positive prediction than for a false-negative prediction;

receiving a current trip request by a passenger, wherein the passenger is associated with a plurality of prior trip requests within a prior time window, wherein each of the plurality of prior trip requests is associated with a plurality of features comprising a time window profile, a prior driver profile, a passenger profile, and a prior trip outcome;

generating a plurality of scores for each of the plurality of prior trip requests from the plurality of features associated with the prior trip request;

determining a plurality of patterns from the corresponding scores of the plurality of prior trip requests;

determining a risk for the current trip request from the plurality of patterns by inputting the plurality of patterns into the machine learning model and obtaining a predicted risk of the current trip from the machine learning model; and assigning a current driver to the current trip request based on the risk of the current trip request relative to a trip risk threshold.

4. The system of claim 3, wherein the plurality of features includes a number of drivers assigned to the plurality of prior trip requests, a number of the plurality of prior trip requests, trip destinations of the plurality of prior trip requests, trip request time of the plurality of prior trip requests, and a prior trip request of the plurality of prior trip requests having a trip completion time after a trip request time of a subsequent prior trip request of the prior trip requests.

5. The system of claim 3, wherein the prior driver profile of the prior trip request includes an age of a prior driver assigned to the prior trip request, a gender of the prior driver, a rating of the prior driver, a presence of a photo of the driver, and a car model associated with a profile of the driver.

6. The system of claim 3, wherein the passenger profile includes a behavior history of the passenger and stored payment information of the passenger.

7. The system of claim 3, wherein determining the plurality of patterns includes determining the plurality of patterns from the corresponding scores of the plurality of prior trip requests using a time series technique.

8. The system of claim 3, wherein the plurality of training trips are sampled from an original dataset, and wherein the plurality of training trips have a higher occurrence rate of training trip requests with positive trip than the original dataset.

9. The system of claim 3, wherein assigning the current driver to the current trip request comprises determining the risk of the current trip request is below the trip risk threshold.

10. A method for identifying a high risk trip, the method comprising:

under control of one or more processors:

training a machine learning model based on a plurality of training trips sampled from a plurality of historical trips to determine a risk for a given trip request, wherein the training comprises:

generating a plurality of historical scores for each of the plurality of training trips based on features of the each training trip;

determining a plurality of historical patterns based on the plurality of historical scores for each of the plurality of training trips;

inputting the plurality of historical patterns into the machine learning model to obtain predictions;

adjusting parameters of the machine learning model to converge the predictions and corresponding trip labels of the plurality of training trips, wherein the parameters are adjusted to penalize incorrect predictions and thus minimize future incorrect predictions, and the parameters are adjusted with a less degree for a false-positive prediction than for a false-negative prediction;

receiving a current trip request by a passenger, wherein the passenger is associated with a plurality of prior trip requests within a prior time window, wherein each of the plurality of prior trip requests is associated with a plurality of features comprising a time window profile, a prior driver profile, a passenger profile, and a prior trip outcome;

generating a plurality of scores for each of the plurality of prior trip requests from the plurality of features associated with the prior trip request;

determining a plurality of patterns from the corresponding scores of the plurality of prior trip requests;

determining a risk for the current trip request from the plurality of patterns by inputting the plurality of patterns into the machine learning model and obtaining a predicted risk of the current trip from the machine learning model; and assigning a current driver to the current trip request based on the risk of the current trip request relative to a trip risk threshold.

11. The method of claim 10, wherein the plurality of features includes a number of drivers assigned to the plurality of prior trip requests, a number of the plurality of prior trip requests, trip destinations of the plurality of prior trip requests, trip request time of the plurality of prior trip requests, and a prior trip request of the plurality of prior trip requests having a trip completion time after a trip request time of a subsequent prior trip request of the prior trip requests.

12. The method of claim 10, wherein the prior driver profile of the prior trip request includes an age of a prior driver assigned to the prior trip request, a gender of the prior driver, a rating of the prior driver, a presence of a photo of the driver, and a car model associated with a profile of the driver.

13. The method of claim 10, wherein the passenger profile includes a behavior history of the passenger and stored payment information of the passenger.

14. The method of claim 10, wherein determining the plurality of patterns includes determining the plurality of patterns from the corresponding scores of the plurality of prior trip requests using a time series technique.

15. The method of claim 10, wherein the plurality of training trips are sampled from an original dataset, and wherein the plurality of training trips have a higher occurrence rate of training trip requests with positive trip than the original dataset.

16. The method of claim 10, wherein assigning the current driver to the current trip request comprises determining the risk of the current trip request is below the trip risk threshold.

* * * * *